L. J. NEWLAN.
BOLT CUTTER.
No. 66,986. Patented July 23, 1867.
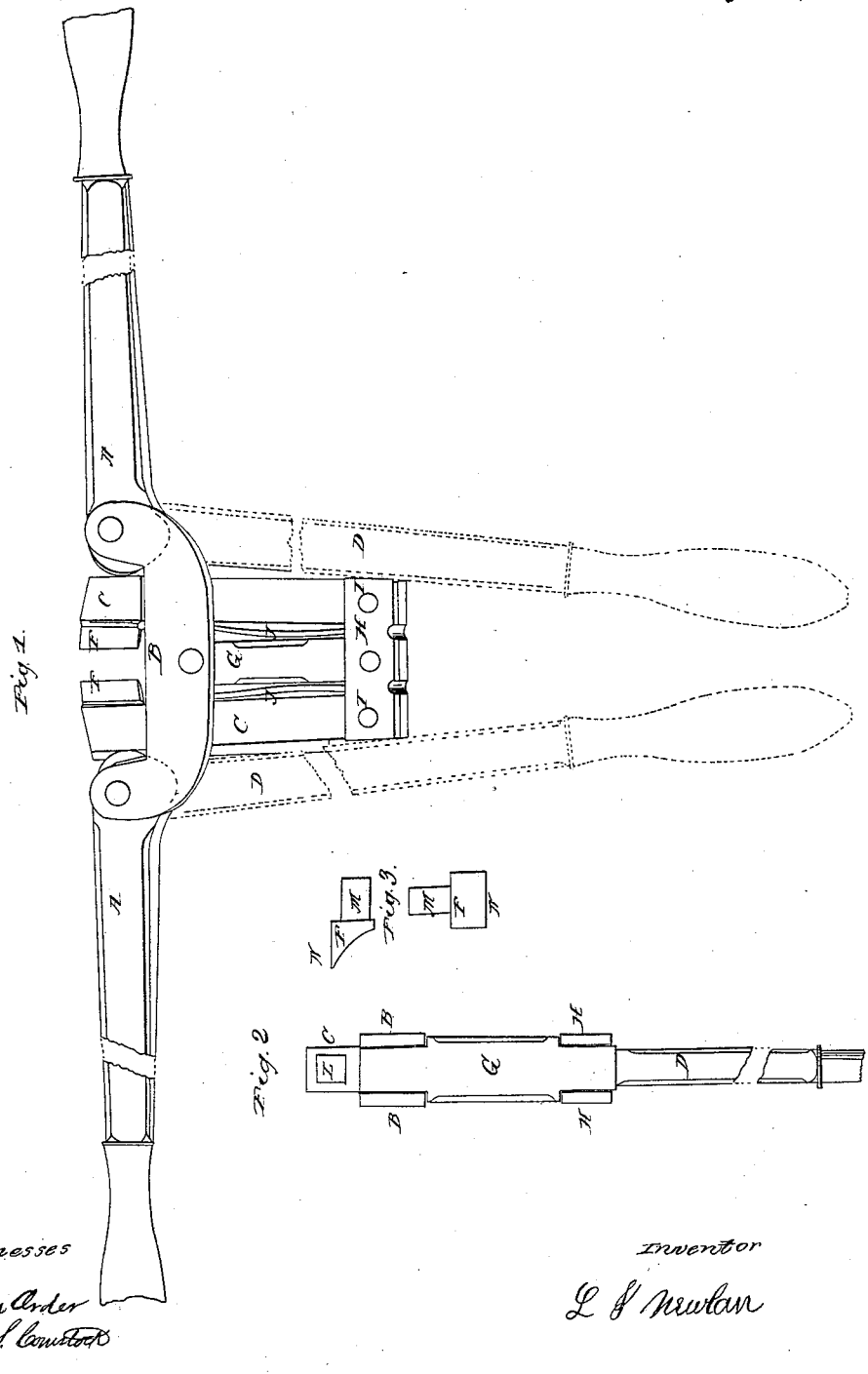

United States Patent Office.

LEVI J. NEWLAN, OF BARTON, NEW YORK, ASSIGNOR TO HIMSELF AND STEPHEN F. MACK.

*Letters Patent No. 66,986, dated July 23, 1867.*

---

IMPROVED BOLT-CUTTER.

---

*The Schedule referred to in these Letters Patent and making part of the same.*

---

TO ALL WHOM IT MAY CONCERN:

Be it known that I, LEVI J. NEWLAN, of the town of Barton, in the county of Tioga, and State of New York, have invented an Improved Tool for Cutting or Trimming Carriage and other Bolts; and I do hereby declare that the following is a full and exact description thereof, reference being had to the annexed drawings, and to the letters thereon.

My object is to make a hand-tool for the above purpose and similar uses. To effect this I use several devices in connection with each other. First, I make a frame to hold the jaws and handles of the tool. Second, to this frame I hinge two jaws, so that, fixed at the one end of each, they open and close at their other ends; and further, I keep the jaws apart by springs, except as closed by the handles. Third, to these jaws I attach cutting-bits or pieces of steel tempered and shaped so as to cut the bolts; and further, to suit the various emergencies in which the tool may be used, I make these cutting edges or bits adjustable, by putting them in square or other shaped holes, so that they can be turned or changed to face various directions, and also for the purposes of repair and adaptation to the work they do. Fourth, I open and close the jaws and the cutters by lever handles, on the hinged ends of which are eccentrics or cam surfaces, so made as to press against and close the jaws and cutters, and thus cut the bolts. These and other facts are apparent in the drawings, which are colored, the better to exhibit the several parts of the tool, and in which—

Figure 1 is a view of one side of my bolt-trimmer, and

Figure 2 a section of the same, and

Figures 3 views of the cutting bits of steel.

In fig. 1, A and A are the handles, of any convenient length, which operate the tool, and are fastened to B, the upper members of the frame, by hinge rivets. The dotted lines show the eccentrics or cams that close the jaws C and C. When the handles are closed, as represented by the red colored position of them, marked D and D, the cutters F and F are closed and the bolt cut off. At G is the middle bar of the frame, and at H one of the lower members of the tool frame; the rivets I and I being the ones on which the jaws C and C are hinged. The springs J and J hold the jaws apart except when closed by the handles A and A. In fig. 2 the same letters indicate the same parts. The cutting-bit is removed from the hole L, showing that it is square or other similar shape for the purpose of turning the cutters in several directions, by slipping them out and putting them in differently, thus better fitting the various positions in which the tool is to be used, and also for various-shaped cutters when convenient or necessary. In figs. 3 the shank M of the cutter or bit F is seen to be made to fit the hole in the jaws C, and at N is the cutting edge of the bit. The other uses and parts of my bolt-trimmer are apparent to those skilled in the arts to which it appertains

Claim.

1. I claim making the frame of a bolt-trimming tool of the parts B, G, and H, for the purpose of supporting and controlling the other parts, substantially as figured and described.

2. I claim, in combination with the described frame of my bolt-trimmer, the use of two cammed levers A and A hinged on the transverse pieces B, and of two jaws or knife-holders C and C hinged on the pieces H, when made and operating as described.

3. I claim the square, many-sided, or other shaped holes for the knives F and F in the jaws C and C, so made that the knives can be turned or changed so as to suit the cutting of bolts in various places and positions, in combination with the other figured and described parts of my bolt-trimmer, as set forth.

4. I claim the described hand-tool made of the several figured and described parts, as a combined whole, making a convenient and effective instrument for trimming off the bolts of carriages and other similar uses, as described.

L. J. NEWLAN.

Witnesses:
L. VAN ARDEN,
GEORGE S. COMSTOCK.